Jan. 4, 1966   W. HASENCLEVER   3,226,804
METHOD OF SOLDERING PELTIER DEVICES
Filed March 12, 1963

INVENTOR.
WERNER HASENCLEVER
BY
AGENT

United States Patent Office 3,226,804
Patented Jan. 4, 1966

3,226,804
METHOD OF SOLDERING PELTIER DEVICES
Werner Hasenclever, Duren, Germany, assignor to North American Philips Company, Inc., New York, N.Y., a corporation of Delaware
Filed Mar. 12, 1963, Ser. No. 264,599
Claims priority, application Germany, Mar. 13, 1962, P 28,967
2 Claims. (Cl. 29—155.5)

The invention relates to a method of manufacturing a Peltier device, in which semi-conductor bodies and current bridges are interconnected by soldering.

Peltier devices consist, as is known, of electrically series-connected bodies of different materials. Particularly suitable to this end are semi-conductor bodies of bismuth telluride. A Peltier device of this material consists of electrically series-connected alternately p- and n-type conducting semi-conductor bodies, which are electrically connected to each other by current bridges, for example of copper. In accordance with the direction of the current certain current bridges are cooled, as is known, whereas others are heated. The cooled current bridges are in thermal contact with a body to be cooled, for example a cover plate of copper. It is necessary in this case to provide a thin layer of electrically insulating material between the current bridges and the cover plate to be cooled in order to avoid short-circuit between the current bridges.

With these known devices the difficulty is involved that the insulating layer must be as thin as possible in order to ensure a minimum heat resistance. Moreover, this layer must have an optimally uniform thickness in order to utilize the cooling power of each current bridge as completely as possible. With the manufacture of such a Peltier device the difficulty arises that the cover plate to be cooled, like the surfaces of the current bridges are not sufficiently flat. This involves an undesirable lack of uniformity in the thickness of the insulating layer. This difficulty can be obviated by grinding or scouring in a separate process not only the cover plate but also the current bridges connected already with the semi-conductor bodies, in order to obtain smooth surfaces. However, it is particularly disadvantageous that the current bridges already fastened, preferably soldered to the semi-conductor bodies must be machined, since the current bridges are in general not co-planar to each other due to the substantially unavoidable difference in the thicknesses of the soldering layers.

In the method of manufacturing a Peltier device in which the semi-conductor bodies and the current bridges are joined by soldering, these difficulties are obviated, in accordance with the invention, by using a cover plate as a soldering stamp, which plate has to be fastened to the current bridges in an operation subsequent to soldering.

It is thus ensured that the irregularities of the thickness of the soldering layers compensate the irregularities of the contacting surfaces of the cover plate and of the current bridges, so that it is possible, in a particularly simple manner, to obtain an insulating layer of uniform thickness between said parts.

This method is based on the fact that the liquid soldering layer is capable of supporting the current bridges by its surface tension. It is advantageous to move the soldering stamp so that after contacting the current bridges it can be moved only in the direction towards the Peltier device, whilst it is removed not until the soldering material has solidified.

A satisfactory contact between the current bridges and the cover plate serving as a soldering stamp is obtained, in particular, when as a soldering material use is made of an alloy which expands upon solidification and which contains preferably bismuth.

The invention will be described more fully with reference to the drawing, which shows by way of example an embodiment of the method according to the invention.

FIGS. 1 and 2 show, for the sake of clarity, the surface of the cover plate to be joined to the current bridges with strongly exaggerated unevennesses. For the same reason a holder for the current bridges first loosely disposed is omitted from the figures.

Figure 1:
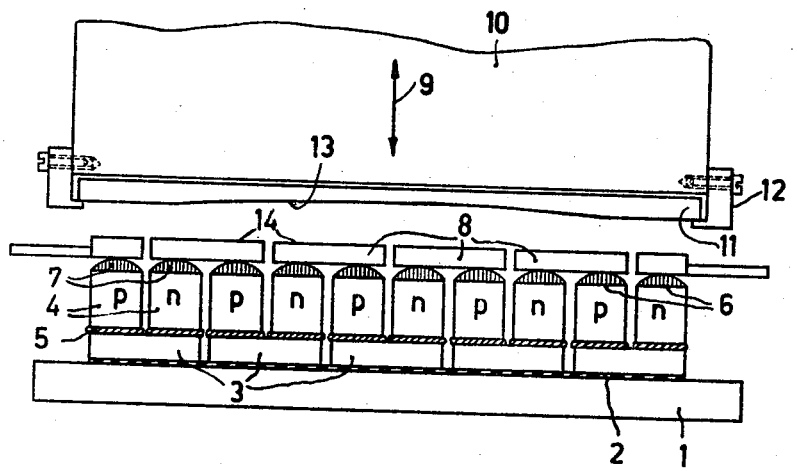
FIG. 1 is a side elevation of a Peltier device and a soldering stamp in one manufacturing stage.
Figure 2:
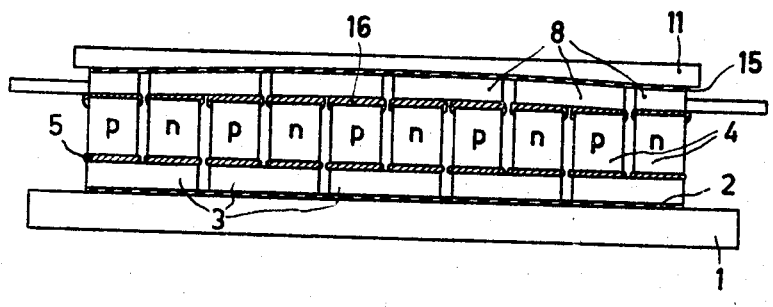
FIG. 2 is a side elevation of the ready Peltier device.

To the base plate 1 (FIG. 1) are fastened with the aid of the electrically insulating soldering layer 2 current bridges 3 of copper, with which semi-conductor bodies 4 of bismuth telluride are connected by means of the soldering layers 5. The semi-conductor bodies 4 are alternately p- and n-type conducting, which is indicated in FIGS. 1 and 2 by p and n. The upper head surfaces 6 of the semi-conductor bodies are coated with solid soldering material, on which the upper current bridges 8 are loosely disposed. The cover plate 11, serving as a soldering stamp, is fastened by means of the clamping pieces 12, to a holder 10, which is adapted to move up and down in the direction of the arrow 9 and which is driven and guided in known manner and which is not shown in FIG. 1.

The soldering material 7 is then melted and by the movement of the holder 10 the cover plate 11 is pressed on the current bridges 8. The thickness of the soldering layers thus matches the shape of the surface 13 of the cover plate 11, so that the upper surfaces 14 of the current bridges 8 will apply itself at least substantially completely to the surface 13.

Subsequent to cooling and solidification of the solder, the cover plate 11 is removed from the holder 10 by disengaging the clamping members 12 and fastened to the current bridges by means of the adhesive layer 15 of uniform thickness (see FIG. 2). The various thicknesses of the soldering layers 16 thus formed are shown in the ready Peltier device in FIG. 2 on a strongly exaggerated scale for the sake of clarity.

In a further embodiment of the method according to the invention the base plate 1 is used like the cover plate 11 as a soldering stamp. Thus the soldering of the semi-conductor bodies 4 to the lower current bridges 3 and to the upper current bridges 8 may be performed in a single operation. In this case the base plate 1 and the cover plate 11 must be used simultaneously as soldering stamps. The soldering method according to the invention permits in a simple manner of producing in series Peltier devices with adhesive layers of a satisfactorily uniform thickness.

What is claimed is:

1. A method of manufacturing a Peltier device comprising the steps of soldering alternatively p- and n-type semi-conductor bodies to relatively narrow current bridges secured to and insulated from a base plate, coating each of the upper surfaces of said semi-conductor bodies with a solid soldering material, loosely disposing upper current bridges on said soldering material, said soldering material being employed in an amount to prevent shorting between said upper current bridges, melting the solder and pressing said loosely dispersed upper current bridges into the molten solder by means of a cover plate pressing down upon said loosely dispersed current bridges to conform upper surfaces of said loosely-dispersed bridges to the lower surface of the cover plate, allowing the molten solder to cool and solidify thus soldering the upper current bridges to the semi-conductor bodies and then fastening the cover plate to the upper current bridges.

2. The method of claim 1 wherein the soldering material is formed by an alloy that expands upon contraction.

References Cited by the Examiner

UNITED STATES PATENTS

| | | | |
|---|---|---|---|
| 2,106,809 | 2/1938 | Prange et al. | 29—472.3 |
| 2,534,134 | 12/1950 | Hasselhorn | 29—493 X |
| 2,938,357 | 5/1960 | Sheckler | 136—4.2 X |
| 2,978,570 | 4/1961 | Hanlein | 219—85 |
| 2,980,746 | 4/1961 | Claydon. | |
| 3,045,341 | 7/1962 | Kolenko et al. | 29—155.5 X |

OTHER REFERENCES

Metals Handbook, published by American Society for Metals, Metals Park, Ohio, 8th edition, 1961, page 864.

WHITMORE A. WILTZ, *Primary Examiner.*

JOHN F. CAMPBELL, *Examiner.*